INVENTOR.
RALPH C. FREVIK
BY
ATTORNEY

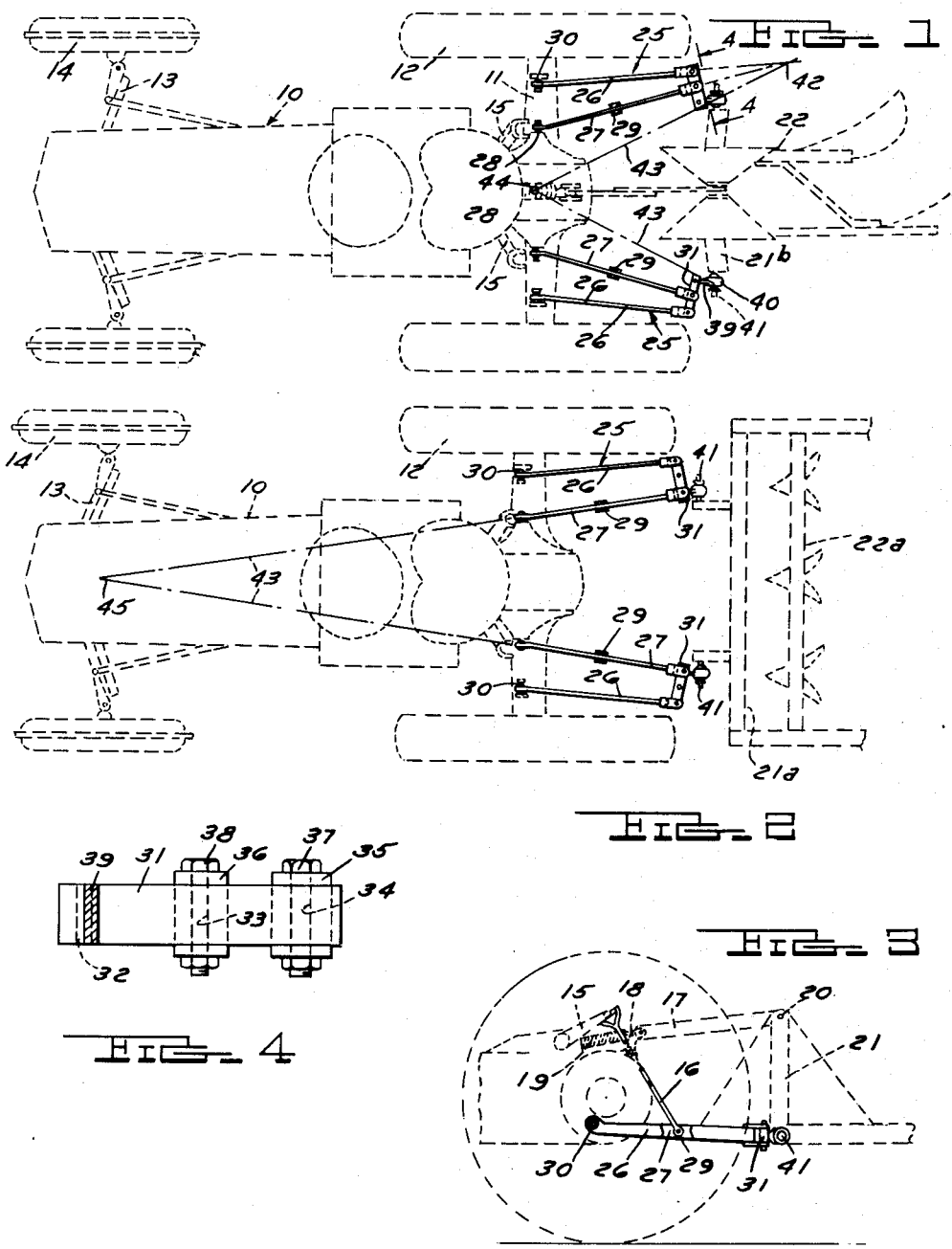

Patented Sept. 29, 1953

2,653,824

UNITED STATES PATENT OFFICE 2,653,824

IMPLEMENT HITCH FOR TRACTORS

Ralph C. Frevik, Detroit, Mich., assignor to Dearborn Motors Corporation, Birmingham, Mich., a corporation of Delaware Application October 8, 1951, Serial No. 250,251

3 Claims. (Cl. 280—33.44)

The present invention relates to an implement hitch for tractors and more particularly to a tractor-implement connection whereby the implement is effectively steered about a selected point remote from the actual points of attachment of the implement to the tractor, the location of the effective steering point being determined by the angular relationship between laterally spaced forwardly converging pairs of link elements each connected to the implement through a steering crank arm.

Certain types of tractors now commercially available, such as the Ford tractor, are provided with implement hitches composed of forwardly converging laterally spaced hitch links pivotally connected at one end to the tractor and at the other end to the implement. As is well-known in the art, such connecting means cause the implement to be effectively steered about a point on the tractor located at the point of convergence of the links. Conventionally, this point of intersection is located at or in the vicinity of the tractor front axle. For use with certain types of implements, such as moldboard and disc plows which create substantial side draft during use, it is preferable to steer the implement about a point in the vicinity of the tractor rear axle, so that the side draft does not interfere with tractor steering. On the other hand, with implements such as cultivators or the like, steering of the implement from a point in the vicinity of the front axle of the tractor is desirable, inasmuch as no side draft is created by the implement and it is desirable that the implement follow the tractor steering.

The present invention now provides an improved form of tractor-implement connection wherein the effective implement steering point may be varied in accordance with the character of the implement being utilized. More particularly, the laterally spaced hitch links of the present invention are each composed of a pair of forwardly divergent link elements having their forward ends connected to the tractor and their rear ends pivoted to a steering crank arm which in turn is pivotally connected to the implement. Although the individual hitch link elements are forwardly divergent, the laterally spaced links, when considered as a whole, are forwardly convergent. Each pair of link elements, by virtue of its divergence and its connection to the steering crank arms, is subjected during working of the implement to forces which, when resolved by geometric projection about the points of element intersection, yield a single force of proper magnitude and direction to steer the implement about a selected effective steering point remote from the actual points of implement-tractor connection. Actually, in the present invention, this resolution of forces is brought about so as to yield a force couple acting forwardly of the elements in a direction passing through the point of actual implement connection to the linkage and the effective steering point which is desired.

In the earlier filed pending application of Raymond W. Wilson, Serial No. 195,158, filed November 13, 1950, and assigned to the assignee of the present invention, there is disclosed an implement linkage whereby an implement may be steered about a selected point on the tractor. The present invention constitutes an improvement on this earlier linkage in that the present invention provides for the variable convergence of the linkage, while at the same time accomplishing the steering within the tractor linkage system, thus eliminating the need of modifying the implement, as in the Wilson invention.

It is, therefore, an important object of the present invention to provide an improved tractor-implement connection effective to steer the implement about a selected steering point located on the tractor.

Another important object is the provision of an implement hitch for steering an implement about a selected one of a plurality of effective steering points, the location of a desired point being determined by the angular relationship between laterally spaced pairs of link elements.

It is a further object of the present invention to provide an implement hitch wherein forwardly converging pairs of individually divergent link elements are subjected to forces which, when geometrically resolved about their points of intersection, yield a force couple operable to steer the implement about a selected effective steering point.

Yet another important object is the provision of an implement hitch including laterally spaced pairs of forwardly divergent link elements connected to an implement through lateral steering crank arms, the crank arms being movable in arcuate paths upon relative lateral movement of the tractor and the implement, the paths of arm movement being centered and the effective implement steering point being located at a point on the tractor.

It is a still further object to provide an implement hitch for tractors including a pair of laterally spaced hitch links each composed of a pair of link elements connected at one end by a steering crank arm, the arm being subjected to resolved forces acting upon the elements and effectively centered at a point located on the tractor.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of an implement hitch of the present invention utilized in connection with a tractor and an implement relatively movable about an effective implement steering point located at the tractor rear axle housing;

Figure 2 is a plan view similar to Figure 1 illustrating the hitch utilized with an implement steerable about an effective point located in the vicinity of the tractor front axle;

Figure 3 is a fragmentary side elevational view of the hitch of Figure 1, one tractor wheel being removed for clarity;

Figure 4 is a sectional view taken along the plane 4—4 of Figure 1; and

As shown on the drawings:

Figure 5:
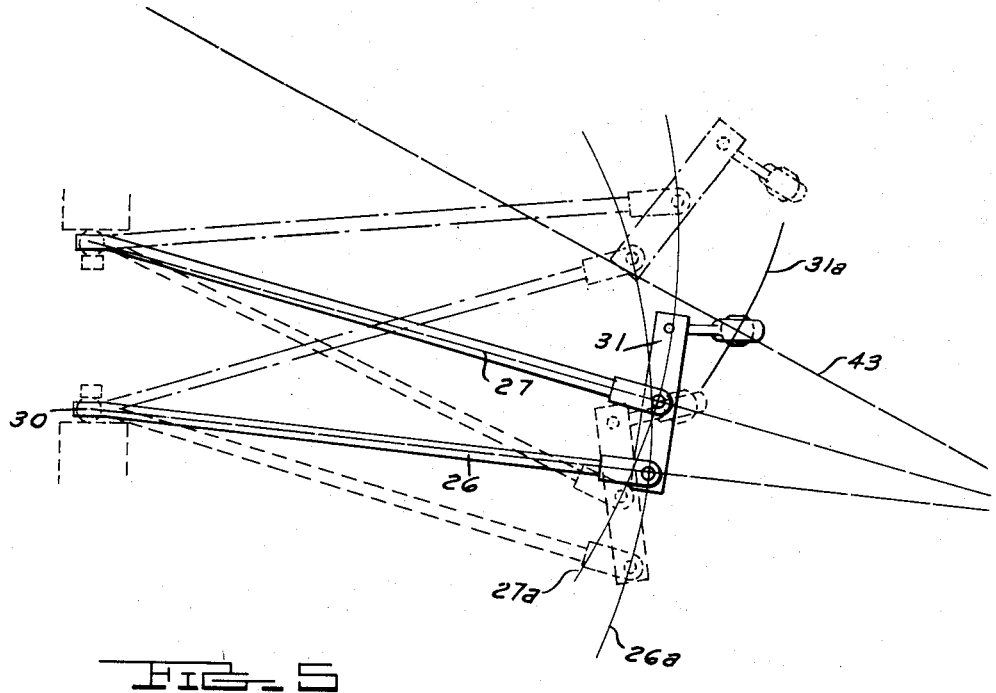
Figure 5 is a diagrammatic view illustrating steering movement of the linkage of Figure 1 and the resolution of forces generated upon such movement.

In Figure 1, reference numeral 10 refers generally to a Ford tractor having a rear axle housing 11 upon which are disposed rear tractor wheels 12 and a front axle 13 upon which are disposed tractor front steering wheels 14. As is conventional in this type of tractor, the rear axle housing is surmounted by a pair of laterally and rearwardly extending power-liftable rock arms 15 energized by a tractor powered hydraulic system (as is well-known in the art) and attached at their rear ends to depending lift arms 16. The tractor is also provided with a rearwardly extending top link 17 (Figure 3) connected through a pivoted reaction arm 18 for coaction with a main control spring 19 of the tractor hydraulic system. The top link 17 is adapted to be connected at its rear end, as at 20, to an implement A-frame 21 carried by a suitable implement, for example the plow 22 of Figure 1 or the cultivator 22a of Figure 2. The hereinbefore described portions of the illustrated tractor and implement are conventional and form no portion of the present invention.

The actual draft connection of the tractor 10 to the implement 22 is provided by laterally spaced hitch links indicated generally at 25 in Figures 1 and 2 and each comprising an outer link element 26 and an inner link element 27. The inner link elements 27 are connected at their forward ends through segmental spherical bearings 28 to an underportion of the tractor rear axle housing, the elements 27 extending rearwardly from the rear axle housing and being connected intermediate their lengths, as at 29, to the lift arms 16 hereinbefore described. The forward ends of the elements 26 are pivotally connected to the tractor rear axle housing, as at 30, in laterally outwardly spaced relationship to the corresponding ends of the elements 27.

The rear ends of the elements 26 and 27 are pivotally attached to laterally extending steering crank arms 31. The crank arms 31 are best shown in Figure 4 and the arms are provided with a plurality of laterally spaced apertures 32, 33 and 34, respectively, in laterally outwardly spaced relation. The rear ends of the link elements 26 and 27 are provided with fixed clevis members 35 and 36, respectively, which are adapted to receive the arm 31 therebetween, and the link elements are secured to the arm 31 by suitable means, as by pivot bolts 37 and 38.

The crank arms 31 are provided with rearwardly extending projections 39 carrying axially bored segmental spherical bearing members 40 adapted to receive therethrough pivot pins 41 carried by the implement drawbar or cross shaft 21b and 21a (Figure 2).

It will be noted that the individual hitch links 26, 27 are forwardly diverging when each pair of elements is individually considered with the links positioned as illustrated in Figure 1, while the hitch links 25 when considered as a whole are forwardly converging. It will also be appreciated that the relative forward divergence of the elements 26, 27 may be varied by removing the pivot bolt 38 from the aperture 33 (Figure 4) to the aperture 32, thus laterally shifting the inner elements 27 to the position illustrated in Figure 2 at which the elements are substantially parallel.

It will be appreciated that the link elements 26, 27 are in tension when the implement 22 is in working position, and the forces upon the elements may be resolved by merely geometrically projecting the elements rearwardly to their point of intersection 42 (Figures 1 and 5). The actual connection of the implement to the linkage is provided by the bearing elements 40, so that the resolved forces acting on the implement must act through the center of the attachment point in alignment with the point 42 about which the forces are resolved. Thus, the force acting upon the implement takes place in the direction of the lines 43, and the effective steering point of the implement is located at the point of intersection of these lines 43, namely at the point 44 at which the lines 43 intersect and which is located at the center of the rear axle housing 11. By applying the same resolution of forces to the hitch illustrated with the cultivator 22a in Figure 2, where the inner link elements 27 have been shifted laterally by insertion of the pivot bolt 38 through the aperture 32, it will be seen that the lines of force 43 intersect at a point 45 located at approximately the front steering axle 13 of the tractor.

Figure 6:
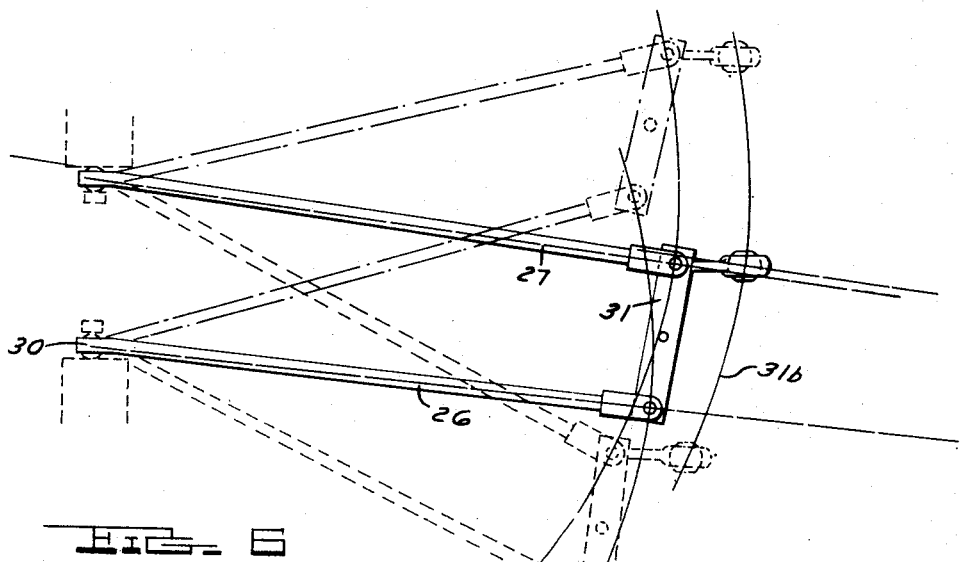
Figure 6 is a diagrammatic view illustrating steering movement of the linkage of Figure 2 and the resolution of forces generated upon such movement.

Referring now to Figures 5 and 6, the resolution of forces acting upon the linkage and the geometric considerations involved will be more fully explained. In the interests of clarity, only one pair of linkage elements is illustrated, and it will be appreciated that the other pair of linkage elements is a mirror image of that illustrated, and that the pairs of elements are symmetrical about the longitudinal vertical axis of the tractor. For further clarity, the linkage is illustrated as moved to a pair of exaggerated positions well beyond those normally assumed in use.

As has been hereinbefore explained, the resolution of forces acting upon the linkage elements results in the yielding of a single force having the desired magnitude and direction. In Figure 5, the arm 26 is of fixed length and acts about a fixed pivot point 30, so that the portion of the steering arm 31 to which the arm 26 is pivoted must move in an arc 26a. Similarly, the portion of the arm 31 to which the element 27 is attached must move in an arc 27a. Consequently, the attachment bearing 40 (being fixed to the steering arm 31) must follow an arc 31a upon relative lateral tractor-implement movement, and the center of movement of this arc 31a is located at a point corresponding to the point 44 hereinbefore described.

Similarly, the geometric construction shown in Figure 6 illustrates the construction of arcs 26b and 27b to yield a bearing arc 31b about the point 45.

It will be noted that the attachment bearing arcs 31a and 31b do not pass exactly through the center of the bearing 31 at all of the illustrated adjusted positions of the bearing, because there is a slight longitudinal shifting of the points 44 and 45 under actual conditions, but the points are, for all practical purposes, located as hereinbefore explained.

Another explanation for the linkage action may be predicated upon the use of an arm (arm 26, for example) to modify and limit the swinging movement of a steering arm (arm 31) carried by a forwardly pivoted main arm (arm 27). The resultant movement of the steering arm is geometrically illustrated in Figures 5 and 6, and such resultant movement may be varied by changing the angular relationship of the elements 26 and 27.

By either explanation and by virtue of the foregoing detailed description, it will be appreciated that the present invention provides a novel means for effectively steering an implement about a selected point located forwardly of and remote from the actual points of implement-tractor connection. This steering is accomplished through the utility of laterally spaced forwardly converging pairs of link elements subjected to tension forces during use, which forces when resolved yield a single force of a direction such that the implement is actually steered in accordance with the force resolution. The crank arm joining each pair of link elements is moved through an angular path upon relative tractor-implement movement, the path being determined by the degree of divergence of, or the angular relationship between, the individual links connected to the crank arm, so that the effective center about which the steering movement occurs may be varied longitudinally of the tractor by changing the divergence of the elements.

Actually, the use of a rectilinear linkage will cause a slight longitudinal shifting of the point of intersection of the force lines 43, so that the points 44 and 45 are actually instantaneous centers rather than the true centers of the arcs 26a—27a and 26b—27b upon which the steering movement occurs. The degree of movement of the points is relatively slight, and for all practical purposes steering movement effectively occurs as illustrated.

It will, of course, be understood that various details of construction may be varied through a wide range without departing from the principles of this invention and it is, therefore, not the purpose to limit the patent granted hereon otherwise than necessitated by the scope of the appended claims.

I claim:

1. An implement-tractor connection comprising laterally spaced pairs of forwardly divergent link elements having their forward ends attachable to the tractor in laterally spaced relation, a separate steering arm pivotally joining the rear ends of each pair of elements respectively and having means pivotally attachable to the implement, the elements of each pair being effective to confine lateral movement of the associated steering arm to an arcuate path about a virtual hitch point located on the tractor and determined by the degree of divergence of the elements of each of said pairs, and means for shifting the point of pivotal attachment of said link elements to said steering arms, thus varying the degree of divergence of the elements of each pair to correspondingly vary the location of said virtual hitch point.

2. An implement hitch for tractors comprising a pair of laterally spaced hitch link structures each including a pair of laterally spaced link elements having corresponding end portions adapted for pivotal attachment to the tractor, crank arms for joining the other ends of each pair of said elements, means pivotally connecting said crank arms to the corresponding pairs of elements, respectively, at least one element of each pair being selectively attachable at one of a plurality of points longitudinally spaced along the corresponding crank arm to vary the angular relationship of the arms of each pair relative to one another, and means on said crank arms for attaching an implement thereto, whereby relative lateral tractor-implement movement causes steering of said implement through said crank arms and said elements about a virtual hitch point located by the angular relationship of said elements.

3. An implement-tractor connection comprising laterally spaced sets of link elements, the individual elements of each set being forwardly divergent and pivotally attachable to the tractor at the forward ends thereof, oppositely directed steering arms attachable through attachment bearings to the implement and projecting laterally therefrom to join, respectively, the rear ends of the link elements of each set, means for varying the divergence of the elements of each of said sets by shifting the rear end of one of said elements of each set along the length of the associated steering arm, the angular relationship between the elements of each of said sets being effective, upon relative tractor-implement movement, to steer the implement about a virtual hitch point located by the resolved forces acting through said attachment bearings.

RALPH C. FREVIK.

References Cited in the file of this patent

UNITED STATES PATENTS

| Number | Name | Date |
| --- | --- | --- |
| 398,177 | Parlin | Feb. 19, 1889 |
| 1,285,506 | Waterman | Nov. 19, 1918 |
| 1,501,652 | Ferguson | July 15, 1924 |
| 1,759,063 | Paul | May 20, 1930 |
| 1,785,124 | Jett | Dec. 16, 1930 |
| 2,640,708 | Fraga | June 2, 1953 |

FOREIGN PATENTS

| Number | Country | Date |
| --- | --- | --- |
| 44,890 | France | Jan. 24, 1935 |